United States Patent
Leibman

[11] Patent Number: 6,134,747
[45] Date of Patent: Oct. 24, 2000

[54] BALL CASTER WITH SNAP-IN BALL

[75] Inventor: Bernard Leibman, Webster, N.Y.

[73] Assignee: Xerox Corporation, Stamford, Conn.

[21] Appl. No.: 09/247,955

[22] Filed: Feb. 10, 1999

[51] Int. Cl.$^7$ ............................................. B60B 33/08
[52] U.S. Cl. ............................................. 16/24; 16/35 R
[58] Field of Search ..................... 16/24, 25, 41, 16/37–39, 31 R, 42 R, 42 T, 35 R

[56] References Cited

U.S. PATENT DOCUMENTS

| | | | |
|---|---|---|---|
| 36,890 | 11/1862 | Bloomfield | 16/24 |
| 956,969 | 5/1910 | Hussey | 16/24 |
| 2,520,375 | 8/1950 | Roe | 16/39 |
| 3,067,451 | 12/1962 | Levin et al. | 16/24 |
| 3,239,022 | 3/1966 | Dolphin | 16/24 |
| 3,456,281 | 7/1969 | Lowry | 16/24 |
| 3,861,306 | 1/1975 | DuBois et al. | 101/450 |
| 4,060,252 | 11/1977 | Mowery | 280/79.1 R |
| 4,203,177 | 5/1980 | Kegg et al. | 16/24 |
| 4,360,267 | 11/1982 | Nettesheim et al. | 355/132 |
| 4,365,733 | 12/1982 | McNew | 226/109 |
| 4,382,637 | 5/1983 | Blackburn et al. | 308/6 R |
| 4,402,108 | 9/1983 | Pannwitz | 16/26 |
| 4,648,706 | 3/1987 | Shibasaki et al. | 355/43 |
| 4,720,115 | 1/1988 | Rehig | 280/79.1 R |
| 4,935,774 | 6/1990 | Ageishi et al. | 355/104 |
| 5,052,075 | 10/1991 | Harris | 16/38 |
| 5,134,915 | 8/1992 | Fukano et al. | 83/563 |
| 5,375,494 | 12/1994 | Kajita et al. | 83/210 |

FOREIGN PATENT DOCUMENTS

| | | | |
|---|---|---|---|
| 5558 | of 1886 | United Kingdom | 16/24 |
| 3483 | of 1887 | United Kingdom | 14/24 |

*Primary Examiner*—Chuck Y. Mah
*Attorney, Agent, or Firm*—Andrew D. Ryan

[57] ABSTRACT

A caster for rollably supporting a device with respect to a support surface is disclosed. The caster includes a body and a spherical member. The body has a concave surface thereof. The spherical member is rotatably contactable with at least a portion of the concave surface and rotatable with the support surface.

25 Claims, 8 Drawing Sheets

BALL CASTER WITH SNAP-IN BALL

The present invention relates to an apparatus for printing machines. More specifically, the invention relates to a caster for a printing machine.

The features of the present invention are useful for any machine which requires occasional relocation, for example, printing machines such as electrophotographic printing machines.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a marking material such as toner particles is transported into contact with the electrostatic latent image in a region known as the development zone. Toner particles are attracted from the magnetic roller to the latent image. The resultant toner powder image is then transferred from the photoconductive surface to a copy sheet and permanently affixed thereto. The foregoing generally describes a typical mono-color single component development electrophotographic copying machine.

Freestanding machines may require occasional relocation. This is particularly true for office-type equipment where relocations occur frequently. Medium size printing machines may be easily relocated when provided with casters for rolling the machines to different locations.

To provide for controllable rolling of a machine with casters, a typical machine includes four casters spaced at opposite corners of a rectangular machine. Two adjacent casters are fixed casters while two are permitted to pivot to provide for a steerable relocation of the machine. Two fixed and two pivoting casters are thus required. Therefore, two separate types of casters must be stored and manufacturing equipment for the two different types of casters must be provided.

Once in location, the machine must be secured in place. Further, the machine may frequently be adjusted to a level position for proper operation of the machine. The machine thus often includes adjustment screws which are used to lift the caster from the floor and to mount the machine on the feet. These adjustment feet are adjustable to level the machine.

Where accurate adjustment for leveling is not required, the casters must, at the least, be locked so that movement of the machine does not occur once the machine is in its proper position. Expensive and complicated brakes are often added to the casters to prevent the rotation of the caster after relocation.

Typical casters include cylindrically shaped wheels which rotate about a first axis. To provide for swiveling of the cylindrical wheels, typically, the caster includes a separate pivoting feature for permitting the caster to pivot along an axis perpendicular to the axis of the caster wheels. The construction and configuration of these types of prior art casters include many components. The quantity of components required is increased when swiveling, height adjustment and locking features are incorporated into the casters. In particular, a caster with a locking brake and swiveling feature may be quite complicated and expensive. Further, the assembly of the prior art casters because of the many complicated parts may be quite time consuming and expensive. Further, the installation of a caster into a machine may be complicated in that often many screws are required to install the caster onto the machine. Further, the cylindrical outer periphery of the wheel may cause the wheel to skid against the surface with which it rolls. This is particularly true if the coefficient of friction of the wheel and the surface are low.

The following disclosures may be relevant to various aspects of the present invention:

U.S. Pat. No. 3,861,306

Patentee: DeBois, et al.

Issue Date: Jan. 21, 1975

U.S. Pat. No. 4,060,252

Patentee: Mowery

Issue Date: Nov. 29, 1977

U.S. Pat. No. 4,360,267

Patentee: Nettesheim, et al.

Issue Date: Nov. 23, 1982

U.S. Pat. No. 4,365,733

Patentee: McNew

Issue Date: Dec. 28, 1982

U.S. Pat. No. 4,382,637

Patentee: Blackburn

Issue Date: May 10, 1983

U.S. Pat. No. 4,402,108

Patentee: Pannwitz

Issue Date: Sep. 6, 1983

U.S. Pat. No. 4,648,706

Patentee: Shibasaki, et al.

Issue Date: Mar. 10, 1987

U.S. Pat. No. 4,720,115

Patentee: Rehrig

Issue Date: Jan. 19, 1988

U.S. Pat. No. 4,935,774

Patentee: Ageishi, et al.

Issue Date: Jun. 19, 1990

U.S. Pat. No. 5,134,915

Patentee: Fukano, et al.

Issue Date: Aug. 4, 1992

U.S. Pat. No. 5,375,494

Patentee: Kajita, et al.

Issue Date: Dec. 27, 1994

U.S. Pat. No. 3,861,306 discloses a combined electrostatic-lithographic duplicating process and apparatus in which an electrostatic master copy of an original document is made in a xerographic copying unit and the master copy is subsequently converted to a lithographic master from which ink copies are made in a lithograph press. The process is carried out as a continuous operation from the making of the electrostatic master copy through the making of the lithographic ink copies in a series of interrelated steps. Also disclosed is a preferred embodiment of an apparatus for carrying out the above process in which the various instrumentalities for performing the specific steps of the process are so interrelated and arranged that the entire process is carried out by the apparatus disclosed in a continuous operation. The various instrumentalities are modular in construction to facilitate shipping, service and replacement of components.

U.S. Pat. No. 4,060,252 transfer apparatus or mat comprised of a generally flat plastic base member having a plurality of ball members received in and extending outwardly from the bottom face thereof in a predetermined pattern. Ball bearing members are received between the ball members and base to facilitate ease of rolling ball members relative to the base. The mat or transfer apparatus provides easy transport means along a ground or floor surface for machines and other objects which are placed on the top face thereof. Means are provided for interconnecting a plurality of the mats in a side-by-side relationship to increase the size of the transfer surface as may be necessary when moving large objects.

U.S. Pat. No. 4,360,267 discloses a method and apparatus for producing printing patterns through the use of a liquid photosensitive resin system. A partially cured resin backing member is applied to a vertical supporting surface and a glass cover plate having a photographic negative mounted on the glass surface is positioned in spaced relation to the backing member. A liquid uncured photosensitive resin is introduced into the space between the backing member and the photographic negative, and an ultraviolet lighting unit is then positioned adjacent the glass cover plate to expose portions of the resin to the light through the photographic negative, causing the exposed portions of the resin to cure or crosslink. The lighting unit is oscillated to provide tapered edges on the exposed crosslinked areas of the resin. Following the crosslinking, the pattern can be removed and the uncured portions of the resin can be washed from the pattern.

U.S. Pat. No. 4,365,733 discloses a system for passing long fan-folded documents and corresponding copy paper through a reproducing apparatus either concurrently or independently of each other, and including a collapsible, upright stand which carries a pair of paper roll supporting elements, a pair of paper guide plates pivotally and detachably connected to the top of the stand, and a guide bar for guiding paper from a roll on the stand to the guide plates. The system further includes a feed tray detachably mounted on a reproducing apparatus and having a partition plate selectively positionable in the feed tray to facilitate containment in the tray of a fan-folded document to be reproduced. The feed tray includes a bottom plate having downwardly projecting ribs to detachably mount the tray on the reproducing machine, and upwardly projecting ribs spaced from a paper discharge slot at the front side of the tray, and acting as an indexing abutment for contacting and positioning the fan-folded document in the tray.

U.S. Pat. No. 4,382,637 discloses a weight transfer roller apparatus including a barrel type housing formed on one extremity with a radially inwardly projecting retaining flange forming a circular protrusion opening. A roller ball is received within the bore of such barrel, has one side projecting from such opening, and has its opposite side nested on an annular high lubricity plastic ring formed with a bearing seat defining a sector of a sphere corresponding with the spherical roller. The annular bearing ring rests on a retainer secured to such housing whereby the housing may be mounted in a weight transfer platform and loads passing thereover will weight downwardly on such ball to be carried by the bearing ring. Preferably, the ball, annular bearing ring, and retainer are telescopically received in the bore of the barrel with the retainer being selectively removable for removal of the bearing and ball for replacement thereof upon deterioration or damage.

U.S. Pat. No. 4,402,108 discloses a caster to provide a mobile support for a burden. The burden may be home or office furniture or may be industrial, laboratory or production equipment. The caster may be inverted and held in a stationary position, and used to support a moving conveyor. In short, the caster enables low friction and an instant way of changing direction on a full 360° plane with a minimum resistance to realign all casters involved into a new direction. The caster is built into a housing body having a semi-spherical socket with a ball caster smaller than the socket residing in the socket and thereby providing a space therebetween for holding a plurality of spherical bearings. The number of bearings is less than that required to fill the space in order to assure recirculation of the bearing balls. However, the balls are retained in the service position by a retainer and/or circular integral races built into the semi-spherical socket. The preferred embodiment of the invention places the support of the burden on the housing body at locations spaced from the vertical axis whereby any housing body flexure will be resisted by the bearing nearest the equator of the caster ball to maintain the spherical form of the socket and full bearing load on all bearings. In all embodiments, an antistatic and lubricating feature maintains the caster free of statically attracted dirt.

U.S. Pat. No. 4,648,706 discloses an image reproduction apparatus which can make a copy of images written or drawn on a board as well as a copy of images of an original provided on an original table. The image reproduction apparatus comprises a board portion and a copying portion. The optical information of images written or drawn on a board is supplied to the copying section through an optical system. The copying section moves between a position where the image reproduction is performed by the above optical information and a position where an ordinary copying of the original is performed. Thus, according to the present invention, the copying section moves between said two positions.

U.S. Pat. No. 4,720,115 discloses a plastic dolly having a pair of longitudinal side members and a pair of transverse end members coupled together by lap joints to form a frame, preferably a rectangle. The various members are molded in a honeycomb/cellular configuration to conserve product weight and materials. Each of the four corner joints includes a caster fastening hole for receiving a caster fastening bolt which securely fastens the joints together and carries a dolly caster wheel. Additional strength and rigidity is provided to the dolly by two long, preferably metal, reinforcement elements disposed in grooves running longitudinally in the side members and extending into the end members U.S. Pat. No. 4,935,774 discloses a method and an apparatus by use of three-dimensional photo-lithographic exposure employed for transferring an image to a recording medium among a series of processing works of practicing groove-processing, etc., corresponding to the image by utilization of photo-etching technology or the like, the apparatus for performing three-dimensional exposure comprising an optical unit, a work gripping assembly, a work moving mechanism, a control unit, and a main body frame, and the optical unit comprising a light source portion, a lens portion, and a reflection mirror, wherein the ultraviolet rays focused by the reflection mirror through a slit of a photomask onto a photo-sensitive coating film formed on an outer surface of a work loosely inserted into the through-hole of the reflection mirror together with a photo-mask surrounding an outer circumference of the work.

U.S. Pat. No. 5,134,915 discloses a rolled-paper feed unit for an image forming apparatus. The unit includes a movable body for reeling out and feeding rolled paper and for cutting the rolled paper into a cut sheet having a predetermined length and a stationary frame which holds the movable body vertically moved from an upper position where the rolled paper is fed to a lowered retreat position where the operator is adapted to carry out certain operations. When feeding the rolled paper to the image forming apparatus main body, the movable body is held at the upper position. When resupplying cut paper to a cassette mounted on the image forming apparatus, or executing a jam processing or the like, the movable body is lowered.

U.S. Pat. No. 5,375,494 discloses a roll paper cutting device is attachable to the main body of an image forming apparatus main body. The roll paper cutting device includes a cutter for cutting the paper of a roll of paper contained therein, as well as an arrangement for feeding the cut sheet to the image forming apparatus. The roll paper cutting device has at least one transport roller for transporting the roll paper, as well as a drive system for driving the transport roller, and a drive change device such as a clutch for selectively bringing the transport roller into idle rotation or into a driven state. A detector detects the travel of the roll paper. A control device such as a CPU controls the rotation of the transport rollers with predetermined timing based on the time when the travel of the roll paper is detected with all the transport rollers in idle rotation in a standby state for paper feeding.

In accordance with one aspect of the present invention, there is provided a caster for rollably supporting a device with respect to a support surface. The caster includes a body and a spherical member. The body has a concave surface thereof. The spherical member is rotatably contactable with at least a portion of the concave surface and rotatable with the support surface.

In accordance with another aspect of the present invention, there is provided an electrophotographic printing machine of the type having a caster for rollably supporting a device with respect to a surface. The caster includes a body and a spherical member. The body has a concave surface thereof. The spherical member is rotatably contactable with at least a portion of the concave surface and rotatable with the support surface.

In accordance with yet another aspect of the present invention, there is provided a caster for rollably supporting a printing machine with respect to a support surface. The caster includes a body defining a first opening. The body has a concave surface thereof. The concave surface includes a portion of a sphere. The concave surface includes a first portion thereof contactable with the spherical member and a second portion thereof in a spaced apart relationship with said spherical member. The caster also includes a spherical member rotatably contactable with at least a portion of the concave surface and rotatable with the support surface. The caster further includes a fastener. At least a portion of the fastener is positionable in the opening. The fastener is adapted for securing the body to the device.

The invention will be described in detail herein with reference to the following figures in which like reference numerals denote like elements and wherein.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 8:
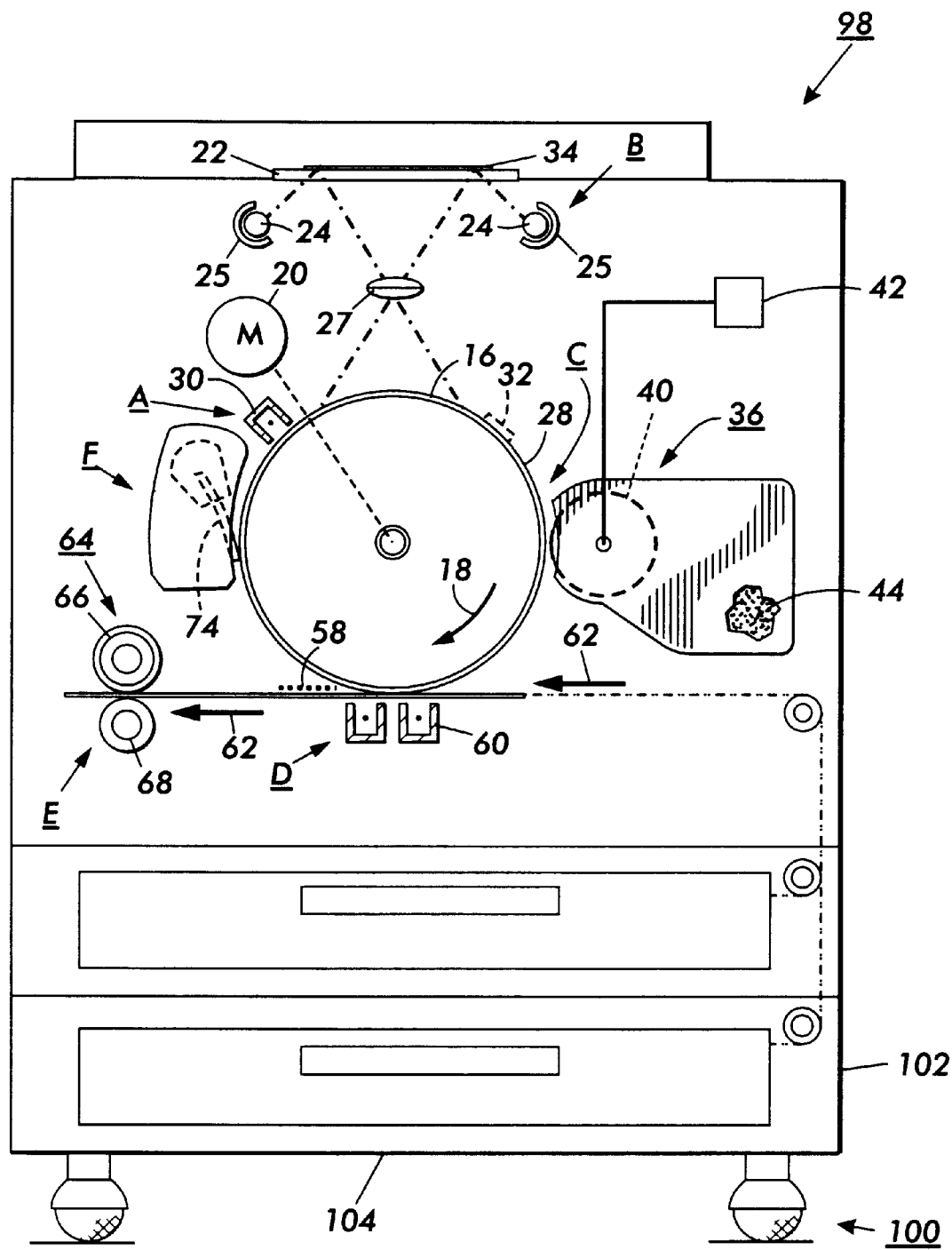
FIG. 8 is a schematic elevational view of an electrophotographic printing machine incorporating the FIG. 1 caster therein.

For a general understanding of the illustrative electrophotographic printing machine incorporating the features of the present invention therein, reference is made to the drawings. In the drawings, like reference numerals have been used throughout to designate identical elements. FIG. 8 schematically depicts the various components of an electrophotographic printing machine incorporating the caster of the present invention therein. Although the caster of the present invention is particularly well adapted for use in the illustrative printing machine, it will become evident that the caster is equally well suited for use in a wide variety of printing machines or for any item that requires convenient relocation and are not necessarily limited in its application to the particular embodiment shown herein.

Referring now to FIG. 8, the electrophotographic printing machine shown employs a photoconductive drum 16, although photoreceptors in the form of a belt are also known, and may be substituted therefor. The drum 16 has a photoconductive surface deposited on a conductive substrate. Drum 16 moves in the direction of arrow 18 to advance successive portions thereof sequentially through the various processing stations disposed about the path of movement thereof. Motor 20 rotates drum 16 to advance drum 16 in the direction of arrow 18. Drum 16 is coupled to motor 20 by suitable means such as a drive.

Initially successive portions of drum 16 pass through charging station A. At charging station A, a corona generating device, indicated generally by the reference numeral 30, charges the drum 16 to a selectively high uniform electrical potential, preferably negative. Any suitable control, well known in the art, may be employed for controlling the corona generating device 30.

A document 34 to be reproduced is placed on a platen 22, located at imaging station B, where it is illuminated in known manner by a light source such as a tungsten halogen lamp 24. The document thus exposed is imaged onto the drum 16 by a system of mirrors 25 and lens 27, as shown. The optical image selectively discharges the surface 28 of the is drum 16 in an image configuration whereby an electrostatic latent image 32 of the original document is recorded on the drum 16 at the imaging station B.

It should be appreciated that the printing machine may be a digital printing machine. In a digital printing machine a ROS (Raster Output Scanner) may lay out the image in a series of horizontal scan lines with each line having a specific number of pixels per inch. The ROS may include a laser(not shown) having a rotating polygon mirror block associated therewith. The ROS exposes the photoconductive surface of the printer.

At development station C, a magnetic development system or unit, indicated generally by the reference numeral 36 advances developer materials into contact with the electrostatic latent images. Preferably, the magnetic developer unit includes a magnetic developer roller mounted in a housing. Thus, developer unit 36 contains a magnetic roller 40. The roller 40 advances toner particles into contact with the latent image. Appropriate developer biasing is may be accomplished via power supply 42, electrically connected to developer unit 36.

The developer unit 36 develops the charged image areas of the photoconductive surface. This developer unit contains magnetic black toner, for example, particles 44 which are charged by the electrostatic field existing between the photoconductive surface and the electrically biased developer roll in the developer unit. Power supply 42 electrically biases the magnetic roll 40.

A sheet of support material 58 is moved into contact with the toner image at transfer station D. The sheet of support material is advanced to transfer station D by a suitable sheet feeding apparatus, not shown. Preferably, the sheet feeding apparatus includes a feed roll contacting the uppermost sheet of a stack copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes a corona generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, stapling, binding, inverting and returning the sheet for duplexing and the like.

After the sheet of support material is separated from the photoconductive surface of drum 16, the residual toner particles carried by image and the non-image areas on the photoconductive surface are charged to a suitable polarity and level by a preclean charging device (not shown) to enable removal therefrom. These particles are removed at cleaning station F. The cleaner unit is disposed at the cleaner station F. The cleaner unit may include a blade 74 that tends to scrape the residual toner particles from the drum 16 and then deposit them into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrophotographic printing machine incorporating the fastener of the present invention therein.

According to the present invention and referring again to FIG. 8, a caster 100 with snap-in ball according to the present invention is shown mounted on device or printer 98. The casters 100 are secured to frame 102 with the caster 100 being secured to bottom 104 of the frame 102.

Figure 1:
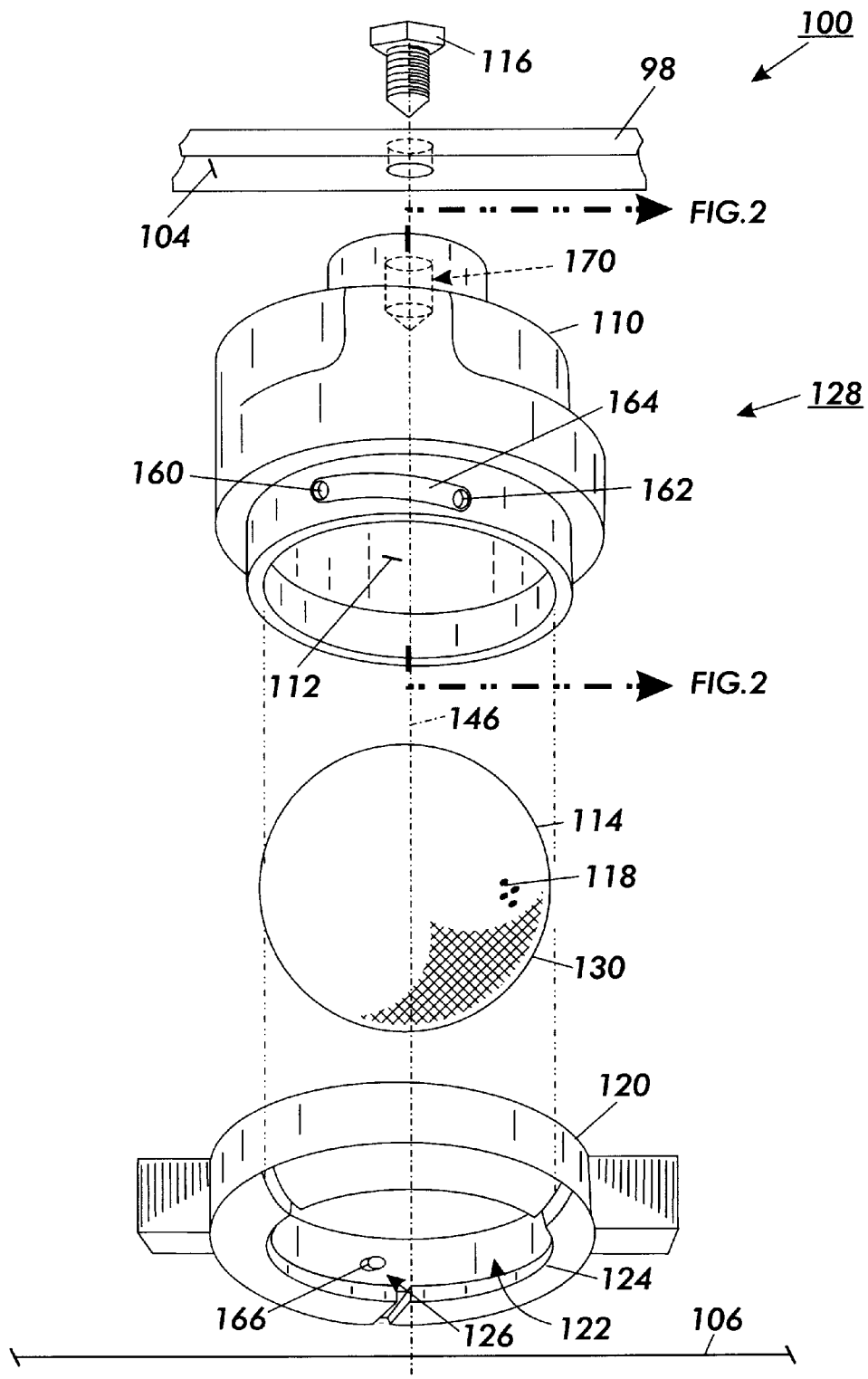
FIG. 1 is an exploded perspective view of a caster according to the present invention.

According to the present invention and referring now to FIG. 1, the spherical member caster 100 is shown. The caster 100 is utilized for rollably supporting a device 98 in the form of a printing machine. The caster 100 is utilized to support the printing machine 98 with respect to a support surface 106 in the form of a floor. The caster 100 includes a body 110 which includes a concave surface 112 thereof. The caster 100 further includes a spherical member or ball 114. The ball 114 is rotatably contactable with at least a portion of the concave surface 112 of the body 110 and is rotatable with respect to the support surface 106.

The body 110 and the ball 114 may be made of any suitable, durable material such as a plastic or a metal. For example, the body 110 and the ball 114 may be made of a moldable material, such as a plastic, for example, nylon or an acetyl such as Delrin®, a trademark of duPont, UK, Ltd.

The caster 100 may be secured to the printing machine 98 in any suitable fashion. For example, the caster may be interferencely fitted, glue, welded or as shown in FIG. 1, be connected to the printing machine 98 by a fastener 116. For example, when the caster 100 is mounted to the printing machine 98 by the use of a fastener 116, the body 110 of the caster 100 may include a first opening 170 to which the fastener 116 is secured.

In order that the ball 114 rotate properly within the body 110 of the caster 100, preferably, the ball 114 should not slip or spin as it contacts the floor 106. To prevent the ball 114 from slipping against the floor 106 and creating various problems including flats (not shown) on outer periphery 130 of the ball 114, preferably, the material and surface finish of both the concave surface 112 and the ball 114 is selected such that the frictional forces between the concave surface 112 of the body 110 and the ball 114 is less than the frictional forces between the ball 114 and the floor 106. By providing a reduced frictional force between the concave surface 112 and the spherical member 114, slippage between the ball 114 and the floor 106 may be reduced so that flats or excessive wear on the ball 114 may be eliminated. To increase the frictional forces between the floor 106 and the ball 114, for example, the ball 114 may include a feature 118 on the surface of the ball 114. The feature 118 may be in the form of voids, dimples or pits on the surface of the ball 114 such as those on golf balls.

While it should be appreciated that the body 110 may trap the ball 114 between the concave surface 112 of the body and the floor 106, preferably, the ball 114 is positively secured to the body 110 to prevent the ball 114 from being lost or mislocated. The ball 114 may be secured to the body 110 in any suitable fashion. For example and as shown in FIG. 1, the caster 100 further includes a retaining member 120 for securing the ball 114 within the body 110.

The retaining member 120 may have any suitable shape and preferably includes an opening 122 for a portion of the ball 114 to extend therethrough so that the ball 114 may contact the floor 106. The retaining member 120 also includes a containing feature 124 for containing the ball 114 within the body 110. The containing feature 124 may be in any form and may, as shown in FIG. 1, be in the form of a inwardly extending lip.

Preferably, and as shown in FIG. 1, the retaining member 120 is removably connected to the body 110. The retaining member 120 may be removably secured to the body 110 in any suitable fashion. For example, the retaining member 120 may be threadedly attached to the body 110, be snap fitted to the body 110 or be latched to the body 110 by a latch (not shown). As shown in FIG. 1, the retaining member 120 is snap fitted to the body 110. The securing feature 126 may as shown in FIG. 1 be in the form of a protrusion or pin which mates with a second securing feature 164 formed in the body 110. The second retaining feature 164 is in the form of a recess or slot.

The retaining member 120 may be made of any suitable, durable material such as a plastic or a metal. For example the retaining member 120 may be made of a moldable material, such as a plastic, for example, nylon or an acetyl such as Deirin®.

Figure 2:
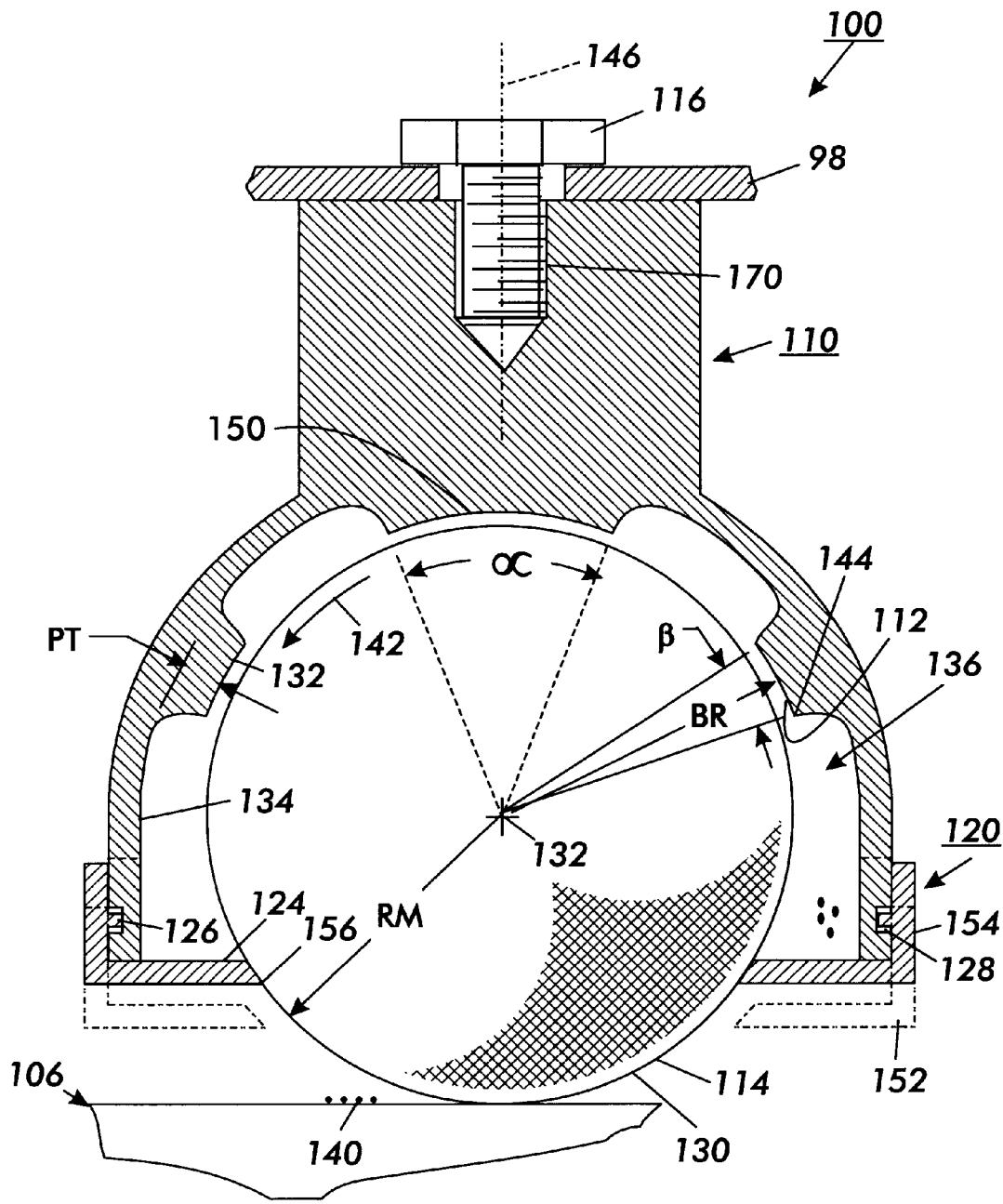
FIG. 2 is a cross sectional view of FIG. 1 along the line 2—2 in the direction of the arrows.

Referring now to FIG. 2, the caster 100 is shown in cross section. As shown in FIG. 2, preferably, the concave surface 112 of the body 110 has a shape which closely conforms to outer periphery 130 of the ball 114. For example, and as shown in FIG. 2, the concave surface 112 is a spherical surface defined by radius BR extending from surface center 132. The radius BR, which defines concave surface 112 is preferably slightly larger than radius RM of the ball 114. The caster 100 may have any suitable size and be made of any suitable durable material capable of supporting the weight of the printing machine 98. For example, for a mid-volume printing machine and as shown in FIG. 2, the ball 114 of the caster 100 may have a radius RM of approximately 0.50–2.0 inches.

Preferably, as shown in FIG. 2, the concave surface 112 of the caster 100 includes a first portion 132 thereof which is contactable with the ball 114 and a second portion 134 thereof which is in a spaced apart relationship with the ball 114. The spaced apart portion 134 provides for a cavity or pocket 136. As the ball 114 rotates along floor 106, contamination 140 in the form of dust or small particles may be attracted by the periphery 130 of the ball 114 and rotate along the periphery 130 toward the concave surface 112. As the ball 114 rotates in the direction of arrow 142, the contamination 140 is removed from the periphery 130 of the ball 114 at edges 144 formed in the first portion 132 of the surface 112. The contamination 140 thus may accumulate within the pocket 136 and prevent the scoring or damaging of the periphery 130 of the ball 114 in the concave surface 112 of the body 110.

The first portion 132 of the body 110 may be positioned anywhere about the body 110 such that the ball 114 is properly supported. Preferably and as shown in FIG. 2, the first portion 132 represents a band about the concave surface 112 of the body 110 and may be defined by radius BR, and angle σ from vertical centerline 146 and by angle β. For example, and as shown in FIG. 2, the angle σ may range from 30 to 80 degrees and may, for example, be approximately 65 degrees. The angle β may vary from for example 5 degrees to 45 degrees and may be approximately 24 degrees.

While the caster 100 may operate satisfactorily with a solitary first portion 132 contactable with the ball 114, alternatively and as shown in FIG. 2, the body 110 further includes a third portion 150 contactable with the ball 114 and spaced from first portion 132. The third portion 150 may be defined by an angle α of for example, 20 to 80 degrees and may for example be approximately 50 degrees. The third portion 150 provides additional vertical support for the ball 114.

It should be appreciated that to prevent the skidding of the ball 114 along the floor 106, the material utilized for the ball 114 and for the body 10 may be selected to minimize the dynamic coefficient between periphery 130 and concave surface 112. To provide for such a low dynamic coefficient of friction, it should be appreciated that concave surface 112 may be coated with a material having a low dynamic coefficient of friction with respect to the periphery 130 of the ball 114. For example, conical surface 112 may be coated with polytetrafluoroethylene (PTFE). The pocket 136 may have any suitable depth capable of providing for the second portion being in relief with respect to the periphery 130 of the ball 114. For example, the pocket may have a pocket thickness PT of 0.02 to 0.10 inches.

Preferably, to maintain the printing machine 98 at a fixed position with respect to the floor 106 when the printing machine 98 is not being moved, the caster 100 is preferably designed to provide for the locking of the ball 114 with respect to the body 110. While the locking feature of the caster 100 may be in any suitable form capable of providing a lock for the ball 114, preferably, for simplicity, the locking mechanism for the ball 114 is in the form of an element or member which provides a normal force between the ball 114 and the body 110. While it should be appreciated that for simplicity a frictional interference between the ball 114 and the body 110 may be sufficient for a retaining feature for the ball rotation with respect to the caster 100, it should be appreciated that the ball 114 and the caster 100 may be mechanically interlocked by a member, for example, a pin (not shown).

For simplicity, and as shown in FIG. 2, the blocking of the ball 114 with respect to the body 110 is accomplished by the use of the retaining member 120. Preferably and as shown in FIG. 2, the retaining member 120 includes a first position 152 with respect to the body 110 as shown in phantom for permitting rotation of the ball 114 while retaining the ball 114 with respect to the body 110. The retaining member also preferably includes a second position 154 with respect to the body 110 as shown in solid for prohibiting rotation of the ball 114 while retaining the ball 114 with respect to the body 110. As shown in FIG. 2, at first position 152 distal end 156 of the lip 124 is spaced from periphery 130 of the ball 114. At second position 154, distal end 156 of the lip 124 is interferencely fitted to the periphery 130 of the ball 114 prohibiting rotation of the ball 114 with respect to the body 110.

While it should be appreciated that any of a variety of mechanisms can be utilized to provide for moving the retaining member 120 from the first position 152 to the second position 154 and to return the retaining member 120 to the first position 152, for simplicity and as shown in FIG. 1, the retaining member 120 is helically or spirally connected to the body 110 thereby permitting the motion to and from the first position 152 and the second position 154 along vertical axis 146. It should be appreciated that the retaining member 120 and the body 110 may have mating threads (not shown) to provide for the movement of the retaining member 120 with respect to the body 110. Preferably and as shown in FIG. 1, the spiral relationship between the retaining member 120 and the body 110 is accomplished by the cooperation of the pin 126 within the helical slot 164 of the body 110.

Preferably and referring again to FIG. 1, the retaining member 120 and body 110 are configured such that the body 110 has a first locking feature 160 for positioning the retaining member 120 in the first unlocked position 152 and a second locking feature 162 for locking the retaining member 120 with respect to the body 110 in the second position 154 for preventing rotation of the ball 114. As shown in FIG. 1, the first locking feature 160 is in the form of a first cavity 160 and the second locking feature 162 is in the form of a second cavity 162. The protrusion 126 is, as shown in FIG. 1, interferencely fitted to the inner surface 164 of the slot 164. The distal face 166 of the pin 126 locks into the first cavity 160 when the retaining member 120 is so aligned with the body 110 and the pin 126 interlocks with the second cavity 162 when the retaining member 120 and the body 110 are so relatively positioned.

Referring again to FIG. 2, the caster 100 may be secured to the printing machine 98 in any suitable fashion. For example, as shown in FIG. 2, the body 110 of the caster 100 includes an internally threaded opening 170 which is threadedly engageable with fastener 116. The printing machine 98 is positioned between the fastener 116 and the opening 170 of the body 110 such that the caster 100 may be securely mounted to the printing machine 98.

Figure 3:
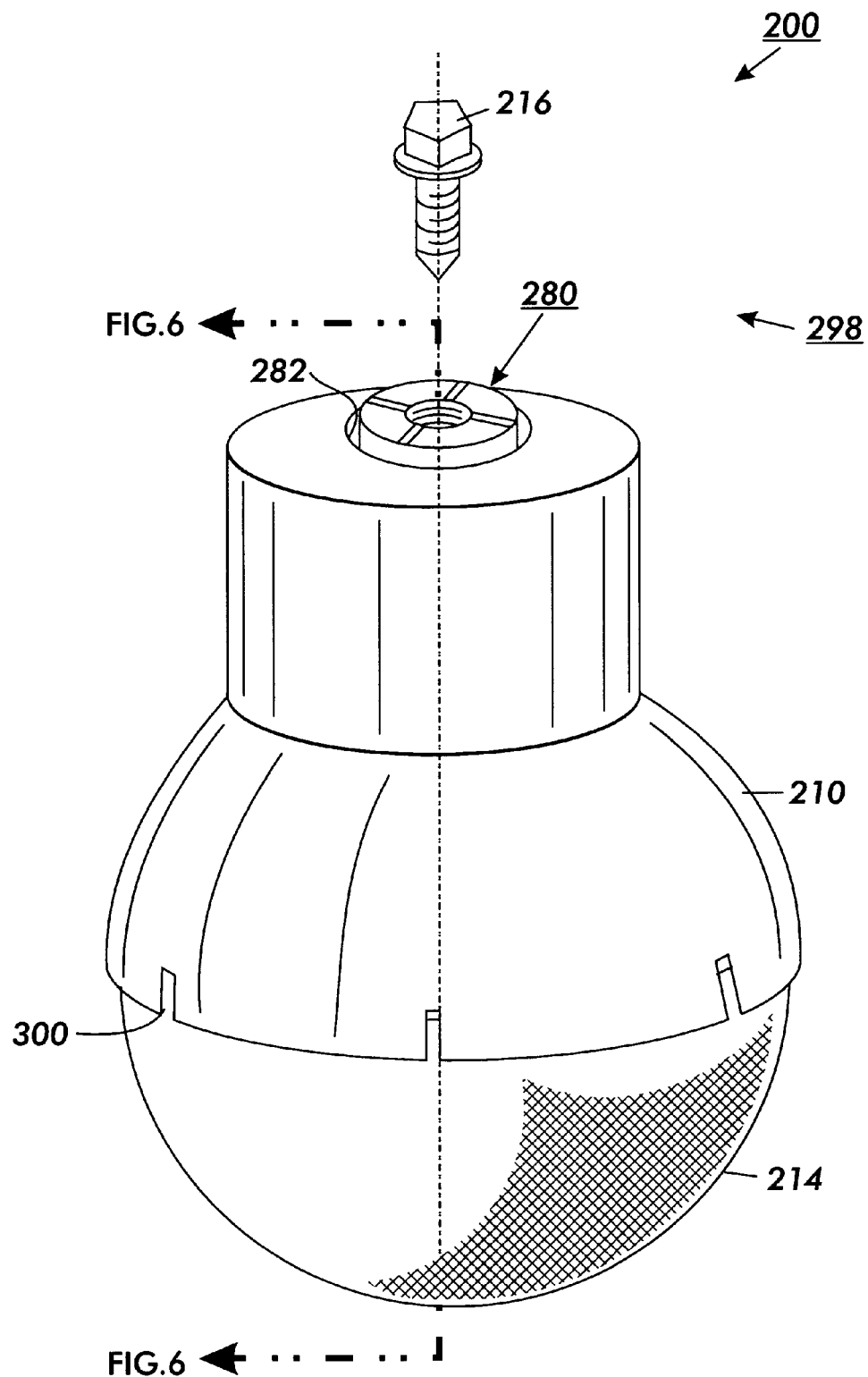
FIG. 3 is an exploded perspective view of an alternate embodiment of a caster according to the present invention.

Referring now to FIG. 3, an alternate embodiment of the present invention is shown as caster 200. Caster 200 is similar to caster 100 of FIGS. 1 and 2 except that caster 200 further includes a protrusion 280 for assisting in securing the caster 200 to the printing machine 298 and that the caster 200 includes body 210 which is different from body 110 of the caster 100 in the manner in which it secures ball 214 to the body 210.

Figure 4:
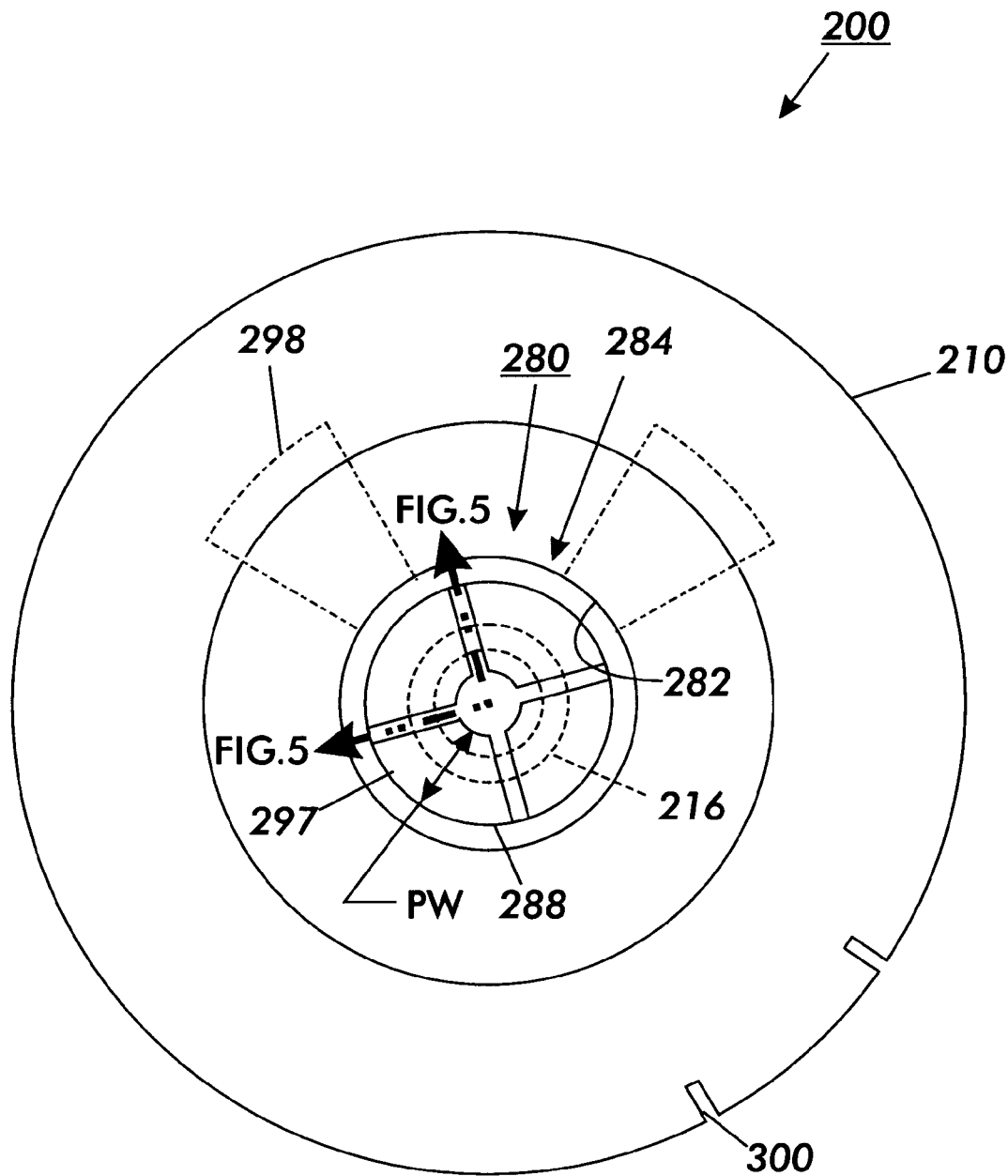
FIG. 4 is a top view of the caster of the FIG. 3.

Referring now to FIG. 4, the protrusion 280 is utilized to improve the ability of the fastener 216 to firmly secure the body 210 of the caster 200 to the printing machine 298. Through the use of the protrusion 280, a small singular fastener 216 may be utilized to rigidly secure a caster to a printing machine. As the fastener 216 is installed into the protrusion 280, the protrusion 280 expands outwardly to interferencely fit with bore 282 of the device 298 thereby rigidly securing the caster 200 to the device 298.

Figure 5:
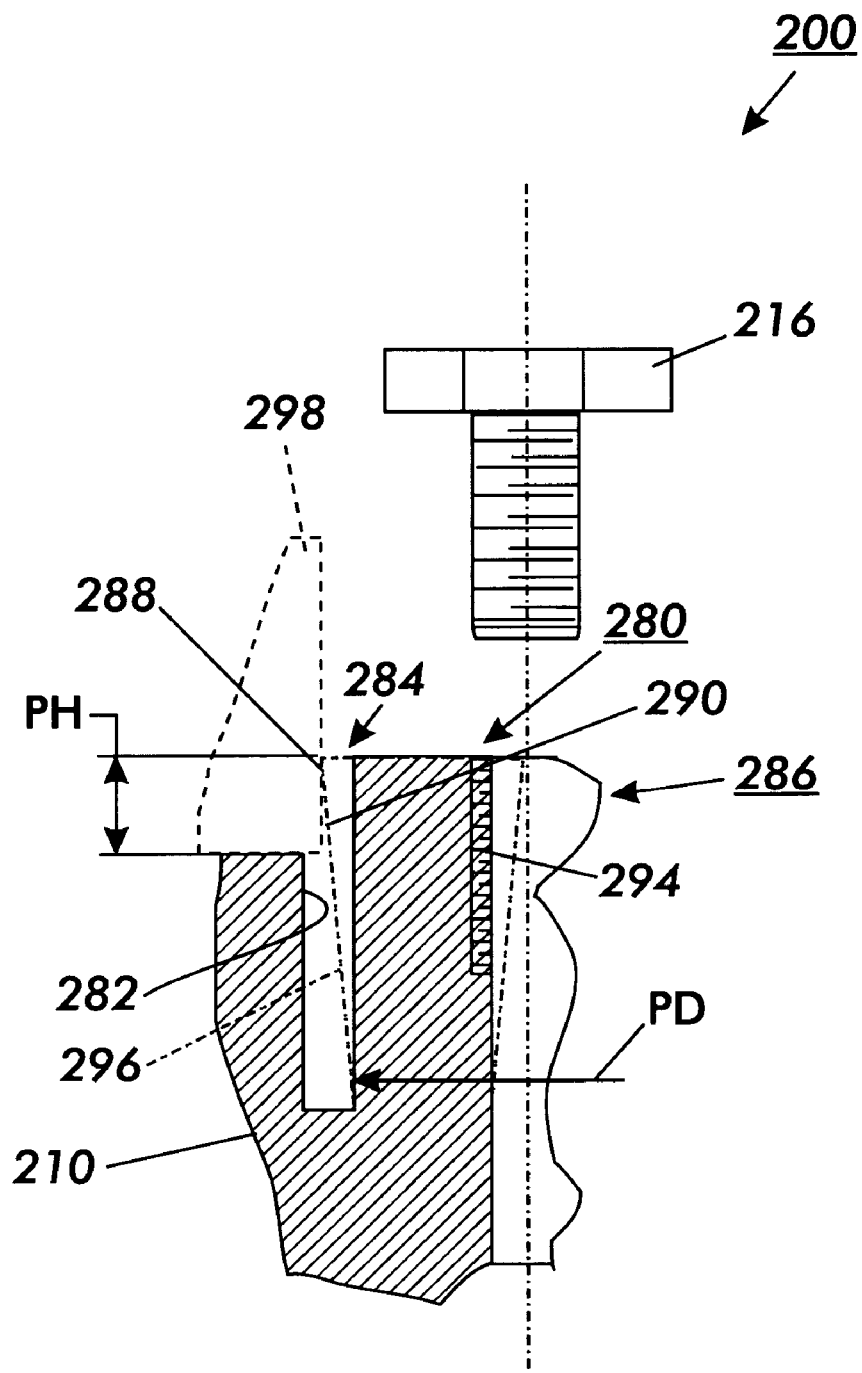
FIG. 5 is a cross sectional view of FIG. 4 along the line 5—5 in the direction of the arrows.

Referring now to FIG. 5, the protrusion 280 is shown in cross section. As shown in FIG. 5, the caster 200 includes the body 210. The body 210 includes a peripheral surface 282 which defines a body cavity 284 of the body 210 (see FIG. 3). The body 210 further includes the protrusion 280 which extends from the body cavity 284. The body 210 of the caster 200 is thereby connected to the device 298 through the protrusion 280. The caster 200 as shown in FIG. 5 further includes the fastener 216 for connecting the body 210 to the device 298. The protrusion 280 defines a protrusion opening 286 therein. The fastener 216 is positionable at least partially within the protrusion opening 286.

The protrusion is expandable as the fastener 216 is positioned into the protrusion 286 so that outer periphery 288 of the protrusion 280 expands into contact with internal periphery 290 of the device 298 to assist in securing the body 210 to the device 298. The protrusion 280 may be made of a separate material from the body 210, but preferably is integral therewith.

The body 210 may be made of any suitable material and may be made of a metal or plastic. Preferably, the body 210 is made of a material with sufficient elasticity to permit the protrusion 280 to become interferencely associated with the internal periphery 290 of the device 298 to permit the body 210 to be locked to the device 298. For example, the body 210 may be made of a plastic with sufficient elasticity. For example, the body 210 may be made of nylon, Delrin®. The body 210 may include additives to increase the lubricity of the body 210 and may include fillers in the form of carbon or glass fibers to increase the strength of the body 210.

The protrusion 280 may have any suitable shape capable of providing an extended portion thereof for contact with the device 298. For example, the protrusion 280 may have an outer diameter PD of, for example, 0.50 to 1.50 inches and may have a diameter PD of 0.8 inches. The protrusion 280 may extend beyond face 292 of the body 210 a distance PH of, for example, 0.10 to 0.50 inches and may for example have a distance PH of 0.25 inches. The fastener 216 may be a fastener of any particular size and may have external threads of ¼–20 inches. The protrusion opening 286 is preferably interferencely sized with the fastener 216. As the fastener 216 is engaged with the protrusion opening 286, the threads of the fastener 216 expand the protrusion 280 and move it from first position 294 to second position 296 as shown in phantom. At the position 296 as shown in phantom, the protrusion 280 contacts internal periphery 290 of the device 298 and thereby secures the body 210 of the caster 200 against the device 298.

Referring now to FIG. 4, while the protrusion 280 may be selected such that the protrusion 280 may be expandable against the device 298 with a solitary protrusion 280, preferably, the protrusion 280 includes a plurality of sectors or portions 297 to provide for sufficient movement of the protrusion 280 such that it may be interferencely fitted with the device 298. For example, as shown in FIG. 4, the protrusion 280 includes four separately spaced apart sectors 297. The protrusion 280 is selected with a protrusion width PW sufficient to provide sufficient resiliency to the protrusion 280 such that it may be deflected into interference with the device 298. For example, the protrusion width PW may be, for example, from 0.10 to 0.60 inches and may be 0.3 inches.

Figure 6:
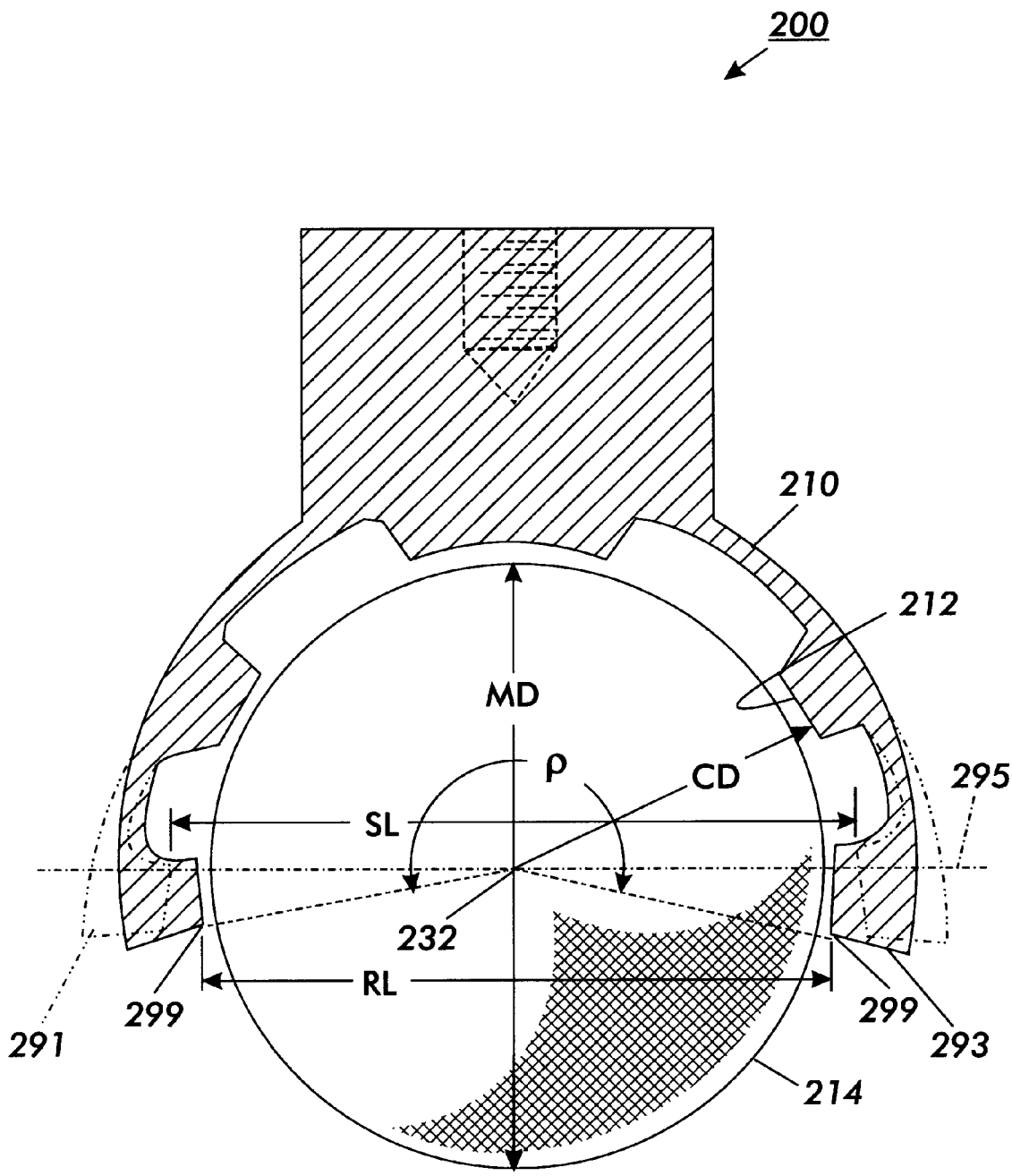
FIG. 6 is a cross sectional view of FIG. 3 along the line 6—6 in the direction of the arrows.

Referring now to FIG. 6, the caster 200 is different from the caster 100 of FIGS. 1 and 2 in that the body 210 of the caster 200 includes a concave surface 212 of the body 210 which extends from above a plane 295 passing through center 232 of the concave surface 212 of the body 210 to a position below the plane 295 so that the body 210 restrains the ball 214 thereto. The ball 214 is inserted into the body by popping the ball 214 into the body 210. This insertion technique is permitted by providing the ball 214 with a ball diameter MD which is larger than distance RL between opposed concave surfaces 212 when the body 210 is in relaxed position 293 as shown in solid.

By inserting the ball 214 upwardly into the body 210, the ball 214 serves to expand opposed concave surfaces 212 such that the body 210 conforms to stretched position 291 as shown in phantom in which the concave surfaces 212 form a distance SL or stretched length which is greater than the ball diameter MD so that the ball 214 may be inserted into the body 210. While it should be appreciated that the material and dimensions of the body 210 may be selected such that the body 210 may have sufficient resiliency to permit the insertion of the ball 214, preferably, an referring again to FIG. 4, the body 210 preferably includes slits 300 therethrough to provide for added resiliency for the body 210 to assist in the insertion of the ball 214 and to the body 210.

Referring again to FIG. 6, distal portions 299 of the concave surface 212 define an included angle ρ of greater than 180 degrees. The proper selection of the angle ρ is dependent on the value of the ball diameter MD, diameter CD of the surface 212 and the resiliency of the material from which the body 210 is made.

Figure 7:
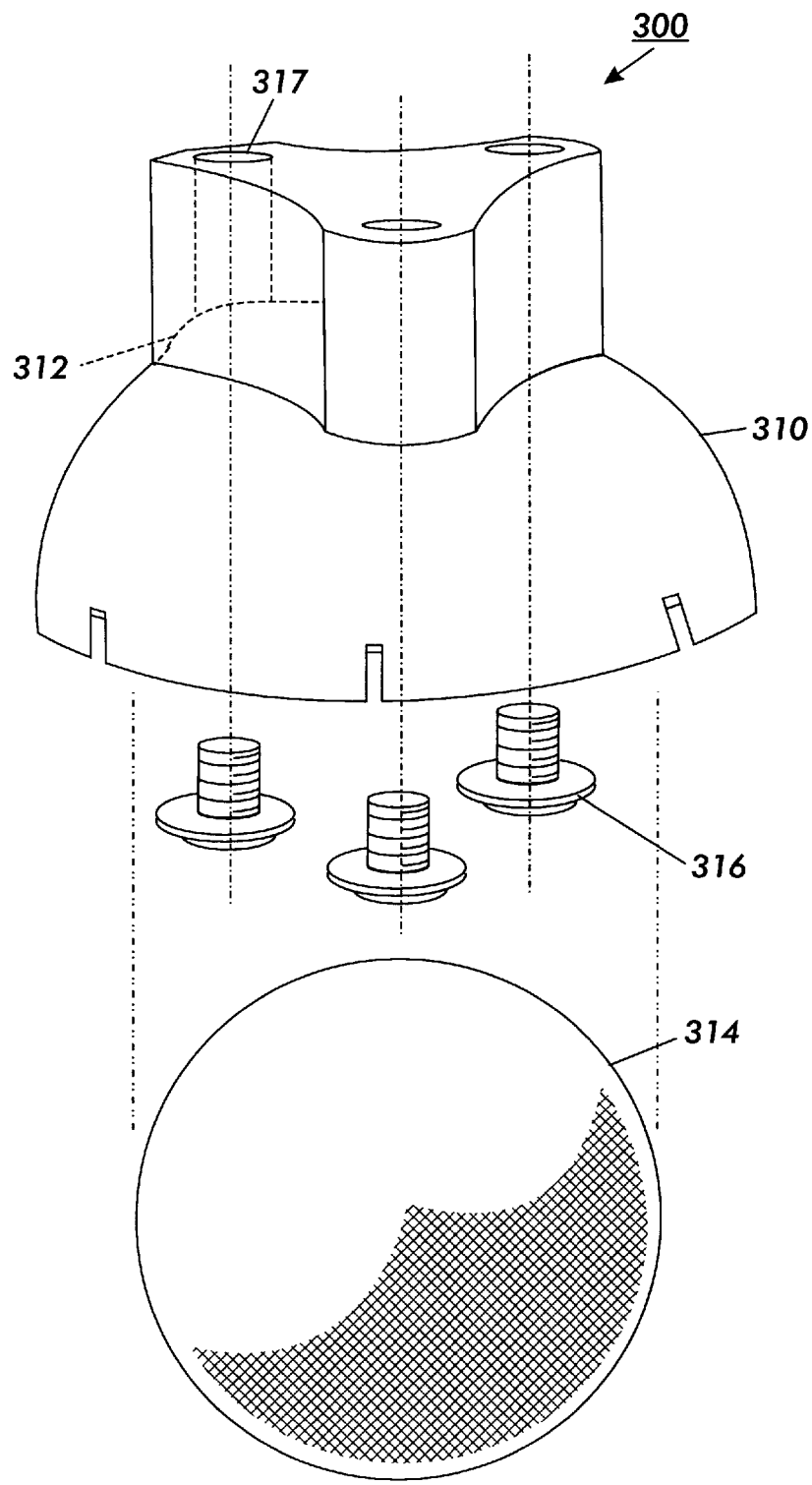
FIG. 7 is an exploded perspective view of another alternate embodiment of a caster according to the present invention.

Referring now to FIG. 7 another alternate embodiment of the present invention is shown as caster 300. Caster 300 is similar to caster 200 in that body 310 is similar to body 210 in that body 310 expands to permit ball 314 which is similar to ball 214 to be inserted or popped into the body 310 by an upward motion of the ball 314. The body 310 is different than the body 210 of the caster 200 in that instead of a single, solitary fastener, the caster 300 includes three spaced apart fasteners 316 which are slidably mated to openings 317 in the body 310. Inner periphery 312 of the body 310 is relieved adjacent the openings 317 so that the fasteners 316 may be in clearance with respect to the ball 314.

By providing a ball and socket type of caster, the number and complexity of components for a caster may be reduced.

By providing a caster including a ball and socket component, manufacturing, and assembly cost may be reduced.

By providing a ball and socket type caster with a snap-in socket, the need for a retaining collar may be eliminated.

By providing a caster including a ball and socket with a retaining ring, a rigid socket may be utilized By providing a caster including a ball and socket with an adjustable retaining ring, a ball and socket type caster may be provided with a simple and inexpensive locking device.

By providing a socket of a ball and caster type with features on the periphery of the ball, a ball and socket type caster may be provided which does not skid or slide in operation.

By providing a ball and socket type caster with a protruding connector, a small inexpensive fastener may be used to rigidly secure the caster to the machine.

By providing a caster including a protrusion having an internal thread, a socket may be provided with a rigid mounting arrangement utilizing a small solitary fastener.

By providing a caster including a ball and socket in which the socket is relieved, a caster may be provided which will accommodate contamination on the periphery of the ball.

By providing a ball and socket type caster including a body which extends above and below the ball, and by providing a resilient body, a snap-in type ball and socket type caster may be provided.

By providing a ball and socket type caster including a retaining ring with a protrusion which mates with a locking feature in the body, a ball and socket type caster may be had which provides for locked and unlocked positions.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A caster for rollably supporting a device with respect to a support surface, said caster comprising:

a body, said body having a concave surface thereof;

a spherical member rotatably contactable with at least a portion of the concave surface and rotatable with respect to the support surface; and a retaining member axially adjustable with respect to the body upon spiral adjustment, the retaining member for retaining the spherical member with respect to the body and for adjusting the relationship between the spherical member and the body;

wherein the retaining member is positionable with respect to the body for permitting rotation of the spherical member and wherein the retaining member is positionable with respect to the body for prohibiting rotation of the spherical member.

2. A caster according to claim 1:

wherein said body defines a first opening; and further comprising a fastener, at least a portion of said fastener positionable in the opening, said fastener adapted for securing said body to the device.

3. A caster according to claim 1, wherein the concave surface comprises a portion of a sphere.

4. A caster according to claim 3 wherein the concave surface comprises a first portion thereof in a contactable relationship with said spherical member and a second portion thereof in a spaced apart relationship with said spherical member.

5. A caster according to claim 3, wherein the concave surface of said body extends from above a plane passing through the center of a conical surface to below the plane so that the body restrains said spherical member thereto.

6. A caster according to claim 1:

wherein said body includes a peripheral surface defining a body cavity of the body; and wherein said body includes a protrusion extending from the body cavity, said body adapted to be connectable to the device through said protrusion.

7. A caster for rollably supporting a device with respect to a support surface, said caster comprising:

a body, said body having a concave surface thereof, said body including a peripheral surface defining a body cavity of the body, and said body including a protrusion extending from the body cavity, said body adapted to be connectable to the device through said protrusion;

a spherical member rotatable contactable with at least a portion of the concave surface and rotatable with respect to the support surface; and a fastener for connecting said body to the device;

wherein said protrusion defines an opening therein, said fastener positionable at least partially within the opening, said protrusion expandable as said fastener is positioned into the opening so that the protrusion expands into contact with at least a portion of the device to assist in securing said body to the device.

8. A caster according to claim 7, further comprising a retaining member removably connected to said body for retaining said spherical member with respect to said body.

9. A caster according to claim 8:

wherein said retaining member is positionable at a first position with respect to said body for permitting rotation of the spherical member while retaining said spherical member with respect to said body; and wherein said retaining member is positionable at a second position with respect to said body for prohibiting rotation of the spherical member while retaining said spherical member with respect to said body.

10. A caster according to claim 7 wherein said spherical member includes a surface thereon for preventing skidding of said member with respect to the support surface.

11. An electrophotographic printing machine of the type having a caster for supporting a device with respect to a surface, said caster comprising:

a body, said body having a concave surface thereof; and a spherical member rotatably contactable with the concave surface and rotatable with respect to the support surface and the body; and a retaining member axially adjustable with respect to the body upon spiral adjustment, the retaining member for retaining the spherical member with respect to the body and for adjusting the relationship between the spherical member and the body;

wherein the retaining member is positionable with respect to the body for permitting rotation of the spherical member and wherein the retaining member is positionable with respect to the body for prohibiting rotation of the spherical member.

12. A printing machine according to claim 11:

wherein said body defines a first opening; and further comprising a fastener, at least a portion of said fastener positionable in the opening, said fastener adapted for securing said body to the device.

13. A printing machine according to claim 11, wherein the concave surface comprises a portion of a sphere.

14. A printing machine according to claim 13 wherein the concave surface comprises a first portion thereof in a contactable relationship with said spherical member and a second portion thereof in a spaced apart relationship with said spherical member.

15. A printing machine according to claim 13, wherein the concave surface of said body extends from above a plane passing through the center of a conical surface to below the plane so that the body restrains said spherical member thereto.

16. A printing machine according to claim 11:

wherein said body includes a peripheral surface defining a body cavity of the body;

wherein said body includes a protrusion extending from the body cavity, said body connected to a device through said protrusion.

17. An electrophotographic printing machine of the type having a caster for rollably supporting a device with respect to a surface, said caster comprising:

a body, said body having a concave surface thereof, said body including a peripheral surface defining a body cavity of the body, said body including a protrusion extending from the body cavity, said body connected to a device through said protrusion;

a spherical member rotatably contactable with the concave surface and rotatable with respect to the support surface; and a fastener for connecting said body to a device;

wherein said protrusion defines an opening therein, said fastener positionable at least partially within the opening, said protrusion expandable as said fastener is positioned into the opening so that the protrusion expands into contact with at least a portion of the device to assist in securing said body to the device.

18. A printing machine according to claim 17, further comprising a retaining member removably connected to said body for retaining said spherical member with respect to said body.

19. A printing machine according to claim 18:

wherein said retaining member is positionable at a first position with respect to said body for permitting rotation of the spherical member while retaining said spherical member with respect to said body; and wherein said retaining member is positionable at a second position with respect to said body for prohibiting rotation of the spherical member while retaining said spherical member with respect to said body.

20. A printing machine according to claim 17 wherein said spherical member includes a surface thereon for preventing skidding of said member with respect to the support surface.

21. The printing machine according to claim 17 wherein the concave surface comprises a portion of a sphere.

22. The printing machine according to claim 17 wherein the concave surface comprises a first portion thereof in a contactable relationship with said spherical member and a second portion thereof in a spaced apart relationship with said spherical member.

23. The printing machine according to claim 17 wherein the concave surface of said body extends from above a plane passing through the center of a conical surface to below the plane so that the body restrains said spherical member thereto.

24. A caster for supporting a printing machine with respect to a support surface, said caster comprising:

a body defining a first opening, said body having a concave surface thereof, the concave surface including a portion of a sphere, the concave surface including a first portion thereof contactable with a spherical member and a second portion thereof in a spaced apart relationship with said spherical member;

a spherical member rotatably contactable with at least a portion of the concave surface and rotatable with respect to the support surface;

a fastener, at least a portion of said fastener positionable in the opening, said fastener adapted for securing said body to a device; and, a retaining member axially adjustable with respect to the body upon spiral adjustment, the retaining member for retaining the spherical member with respect to the body and for adjusting the relationship between the spherical member and the body;

wherein the retaining member is positionable from a first position to a second position for at least one of permitting rotation of the spherical member and prohibiting rotation of the spherical member.

25. An imaging apparatus having a caster for use on a support surface, the caster comprising:

a body having a longitudinal axis, said body having a concave surface thereof;

a spherical member rotatably contactable with at least a portion of the concave surface and rotatable with respect to the support surface; and a retaining member connectable to the body by a pin and slot system, the slot extending at an angle offset with respect to a longitudinal axis of the body, the retaining member adapted to be axially adjustable with respect to the body upon spiral adjustment, the retaining member for axially adjusting the retaining member with respect to the longitudinal axis of the body and for retaining the spherical member;

wherein the retaining member is adjustable positionable to a position for one of permitting rotation of the spherical member and prohibiting rotation of the spherical member.

* * * * *